(12) United States Patent
Feller

(10) Patent No.: US 7,628,080 B1
(45) Date of Patent: Dec. 8, 2009

(54) MAGNETIC FLOW METER PROVIDING QUASI-ANNULAR FLOW

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 12/206,881

(22) Filed: Sep. 9, 2008

(51) Int. Cl.
*G01F 1/58* (2006.01)
(52) U.S. Cl. .................................... 73/861.12
(58) Field of Classification Search .............. 73/861.12, 73/861.14, 861.16, 861.17, 861.15
See application file for complete search history.

(56) References Cited

U.S. PATENT DOCUMENTS

| | | | |
|---|---|---|---|
| 4,454,766 A | * | 6/1984 | Reinhold et al. .......... 73/861.12 |
| 6,571,642 B1 | * | 6/2003 | Feller ...................... 73/861.12 |
| 6,722,207 B1 | | 4/2004 | Feller |
| 6,789,432 B2 | | 9/2004 | Guazzoni et al. |

* cited by examiner

*Primary Examiner*—Jewel Thompson
(74) *Attorney, Agent, or Firm*—David Kiewit

(57) ABSTRACT

An in-line magnetic flow meter has an electrically insulated quasi-annular voltage sensing path defined between an internal wall of a meter body and an outer wall of an axially disposed hollow tube. Although less than 100% of the fluid flow passes through the sensing region, the choice of an inner tube reduces flow impedance introduced by the meter, when compared to other meters providing a quasi-annular sensing path. In addition, by forming two electromagnet coils on a single core and using axially separated pairs of electrodes, the present arrangement allows one to provide two flow meters in the space normally occupied by one.

14 Claims, 2 Drawing Sheets

MAGNETIC FLOW METER PROVIDING QUASI-ANNULAR FLOW

BACKGROUND OF THE INVENTION

1. Field of the Invention

This invention relates to apparatus and method for determining the rate of flow of a fluid by a magnetic flow meter that measures an electrical potential difference developed in the fluid as the fluid moves through a magnetic field.

2. Background Information

In most prior art in-line magnetic flow meters, the electrical potential difference developed in the fluid is sensed by a pair of electrodes contacting the liquid and spaced apart from each other by the diameter of a round flow sensing passage. A magnetic field generated orthogonal to both the line between the electrodes and the direction of flow through the sensing passage is provided by two coils of wire located on opposite sides of and outside of the passage. Sophisticated electronics are used to energize the magnetic field, to amplify the tiny flow-related signals generated, and to reject various noise and drift signal components which would otherwise degrade measurement accuracy. These meters are characterized by an unobstructed flow passage offering very low pressure drop and high tolerance to solids in the fluid, high measurement precision, high power consumption, and high cost.

In his U.S. Pat. No. 6,571,642, the disclosure of which is herein incorporated by reference, the inventor taught an in-line magnetic flow meter that generated higher flow voltages because of the provision of an extended voltage sensing path between the pair of electrodes and of more efficient utilization of the magnetic flux. This extended path was configured as a quasi-annulus formed by obstructing the central part of the fluid flow path with an axial streamlined body. The approach taught in U.S. Pat. No. 6,571,642 was optimized for instruments used for measuring moderate flow rates in which obstruction of the flow passage could be accepted in the interest of reducing cost and power consumption.

The teachings of U.S. Pat. No. 6,671,642 have not been applied to flow meters intended for measuring high flow rates, or for use in large pipes. In these cases the flow obstruction of the streamlined axial body taught in U.S. Pat. No. 6,671,642 causes formidable flow impedance.

BRIEF SUMMARY OF THE INVENTION

One aspect of the present invention is the provision of an in-line magnetic flow meter having an electrically insulated quasi-annular voltage sensing path defined between an internal wall of a meter body and an outer wall of an axially disposed hollow tube. The use of an inner tube, instead of the streamlined body taught in U.S. Pat. No. 6,671,642, is prompted by the desire to reduce the obstruction to flow of the streamlined body. Replacing that body with a largely hollow tube reduces both the meter pressure drop and the size of the support members required to anchor the centered structure to the meter body. It is recognized that the precision of measurement will be reduced because less than 100% of the fluid flow passes through the sensing region. However, the fluid flow rates on the outside and inside of the tube will generally track each other and when they do not, will deviate in a predictable and repeatable way which can be compensated for by the measurement circuitry.

The use of an axially centered structure, regardless of whether it is a streamlined body or an inner tube, establishes an annular path through which the generated voltages occur between the electrodes. Thus, the overall operating principle is the same for either the body or the tube structure.

In a preferred embodiment, the axially disposed inner tube is at least partially formed of a ferromagnetic material in order to concentrate the magnetic flux in the region of the annular voltage sensing path. If the tube is not ferromagnetic a smaller electrode signal will be generated.

In some embodiments materials and fabrication techniques are selected so that the inner surface, or other portions of an inner tube or its attachments that do not abut on the annular voltage sensing passages are electrically conductive. This allows these surfaces to contact the flowing fluid and thereby serve as a convenient signal reference/ground connection to the fluid.

The relative dimensions of the housing and inner tube can affect the ratio of the flow within the quasi-annular sensing region to that within the inner tube. If this ratio changes with flow rate the meter will be non-linear. In a particular preferred embodiment the leading and/or trailing surfaces of the inner tube may be angled to compensate for the change and thereby keep a constant flow ratio. In particular, the tube end surfaces may be shaped so as to tend to increase the proportion of flow within the relatively narrow quasi-annular region as the overall flow rate increases. Doing this allows one to use a narrower quasi-annular region which permits further concentration of the magnetic flux to provide higher electrode voltage generation and/or lower operating power.

In preferred embodiments of the invention two electromagnets comprising substantially identical coils and their associated electrodes and signal amplifying and processing circuits are independently operated, preferably in synchronism, so as to provide what is substantially two flow meters within a common housing.

It should be noted that the tube may be fitted on one end, or preferably on both ends, with flow obstructing attachments so that the proportion of the total fluid flow entering the meter which passes through the tube can be selected for a particular application. For example, a meter intended for very high flow rates could essentially have an unobstructed inner tube to minimize pressure drop whereas the same basic meter intended for very low flow rates would have attachments either with small or no openings for diverting most or all of the flow through the annular flow sensing passages. The electromagnet windings may be on the inner tube or the housing, or multiple windings may be disposed in multiple locations.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

In this largely schematic view some elements have been omitted and the relations between the sizes of various of the elements that are shown have been distorted in the interest of clarity of presentation

DETAILED DESCRIPTION OF A PREFERRED EMBODIMENT

In studying this Detailed Description, the reader may be aided by noting the definitions of certain words and phrases used throughout this patent document. Wherever those definitions are provided, those of ordinary skill in the art should understand that in many, if not most instances, such definitions apply to both preceding and following uses of such defined words and phrases. In particular, the terms "pipe" and "meter body" and "tubular meter body" are used to describe an external portion of the meter of the invention and are distinguished from an inner, generally axially disposed portion of the meter that is generally referred to as the "inner tube", "axial body" or "central body".

Figure 1:
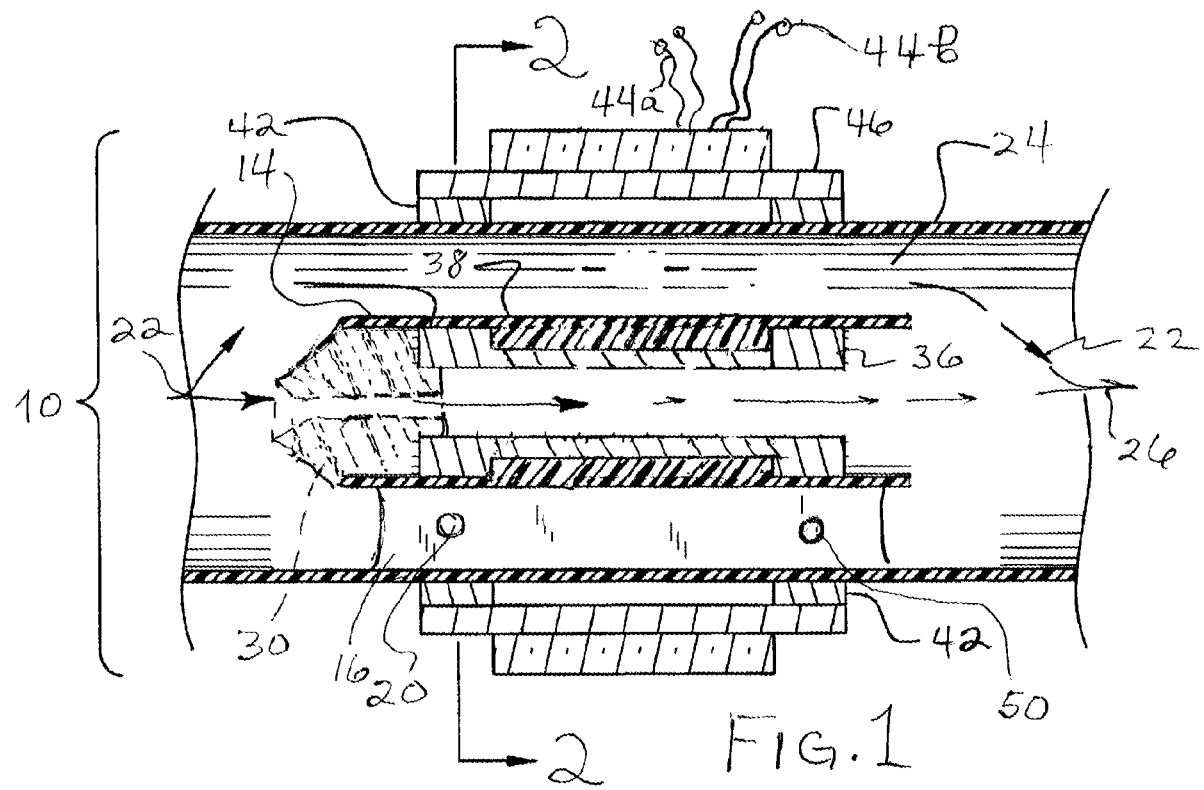
FIG. 1 is a schematic cross-sectional view of a flow meter of the invention. The view is taken in a plane of the flow axis.
Figure 2:
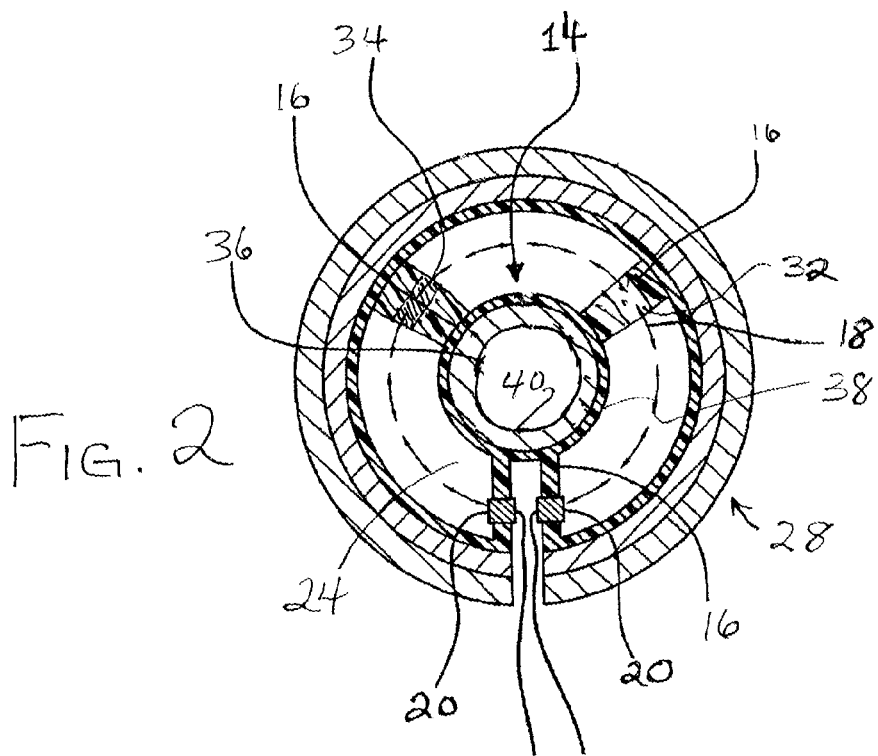
FIG. 2 is a partially schematic cross-sectional view of the embodiment of FIG. 1, the section taken as indicated by the double-headed arrow 2-2 in FIG. 1.

Turning now to FIG. 1 of the drawing, one finds a sensing portion 10 of a magnetic flow meter 12 of the invention designed to extend a product line based upon the teachings of U.S. Pat. No. 6,571,642 to situations in which the flow impedance created by the presence of a central streamlined body is not tolerable. Instead of a closed streamlined body, preferred embodiments of the flow meter of the present invention provide an axially disposed inner tube 14, supported by one or more vanes 16, to define a quasi-annular voltage generating path 18 extending between two paired electrodes 20a, 20b that are preferably located on opposite sides of one of the vanes.

Providing an inner tube splits the fluid flow, as indicated by the diverging and converting arrows 22 in FIG. 1 so that part of the fluid flows through a flow-sensing quasi-annular region 24 adjacent the inner surface of the meter body and the other portion flows through the inner tube 14 along the common axis 26 of the inner tube 14 and meter body 28. It will be recognized that the meter designer will have to make design trade-offs between having most or all of the fluid flow through the sensing region 24 and accepting a large pressure drop, and having most of the fluid flow through the inner tube 14 and accepting a loss of precision. One arrangement for facilitating such trade-offs and for permitting the wider use of a single set of hardware components, is to provide an obstructing body within an existing inner tube so as to partially obstruct flow through that tube. A preferred obstruction is provided by optional streamlined entrance and exit nozzles 30 adapted to fit onto the upstream and downstream ends of the inner tube.

The skilled artisan who has read my U.S. Pat. No. 6,571,642 will recognize that if multiple support members or vanes 16 are used to support the inner tube 14, one must still provide an electrically continuous conducting quasi-annular path 18 and must not obstruct that path with an entirely electrically insulating vane, other than the support member on which the sensing electrodes associated with that path are mounted. The requisite continuous quasi-annular path may be provided by several means, these include, without limitation, providing a hole or slot 32 through an insulating vane, or providing an isolated electrical conductor 34 extending through a vane. Of course, aside from the sensing electrodes and any such isolated conductor, the quasi-annular path through the fluid abuts only electrically insulating materials.

It is noted that surfaces such as the inside of the inner tube or portions of the tube attachments which are not near the annular passages used for generating the flow responsive signals may be electrically conductive, in which case they may serve as a convenient signal reference/ground connection to the fluid.

A preferred inner tube 14 may comprise a ferromagnetic portion 36 shaped to enable the magnetic flux to concentrate in the electrode planes where it will enable the largest electrode signals to be detected. The outer surface of this tube 14 would have an electrically insulating coating 38, but the inner surface 40 of the inner tube 14 could be an exposed metallic surface—e.g., if the inner tube was formed from a 400-series ferritic stainless steel. This is relatively convenient since full bore magnetic flow meters generally have their interiors coated for electrical insulation and special provision has to be made for their reference connection to the fluid.

The portions of the annular flow sensing passages occupied by the vane(s) 16 supporting the tube 14 do not provide passage for the flowing fluid. In order that essentially all of the available magnetic flux is used to generate flow responsive signals between the electrodes, the ferromagnetic pieces of the tube and/or housing may be shaped so that a shorter distance exists between them where the flow occurs than where it is prevented by the vanes. That is, in some applications, the ferromagnetic portions 36 of the device may not be circularly symmetric about the axis 26 of the flow tube.

When one considers magnetic flow meters carrying fluid under substantial pressure, the housing of the meter may need to have relatively thick walls. Such housings are conventionally made from an austenitic and non-ferromagnetic stainless steel such as type 316 pipe. In these cases the wall thickness increases the length of the magnetic flux path, thereby diminishing the effective flux useful in generating a voltage between the electrodes. The decrease in the flux can be minimized by locating the magnetic pole pieces 42, which provide low reluctance paths for the flux, in openings such as circumferential grooves made in the pipe wall. In order that the strength of the assembly is maintained, the openings are preferably not continuous but ribbed and the pole pieces may be inserted in them and attached by welding or silver soldering. The resulting annular flux path, though not continuous, concentrates the flux at the locations of the pole pieces so that the generated voltages are not significantly diminished.

For certain applications like that of irrigation water metering, the temperature and pressures are relatively low and the housing 28 may be made from plastic materials such as PVC pipe. In such an application adhesives such as acrylics and epoxies would typically be employed to attach the pole pieces.

The skilled artisan who has read my U.S. Pat. No. 6,571,642 will recognize that although the present drawing depicts only an arrangement in which the magnetic field is generated by a coil or coils 44a, 44b external to the pipe, one could equally well use only a coil or coils disposed in the inner tube, or could use a combination of external and internal coils.

Although various combinations of coils were described in U.S. Pat. No. 6,571,642, whatever coils were present were driven from a single excitation source. In a particular preferred embodiment of a flow meter of the invention, two substantially identical coils 44a, 44b are used with a common core 46 and are independently excited. The preferred excitation circuits 48, schematically depicted in FIG. 3, may be synchronized to operate together to combine the magnetic fluxes that they produce or to operate independently, should a circuit or coil failure occur.

The coils 44a, 44b can be easily made to be essentially identical by means of interleaving or bifilar winding, so that when they are operated in synchronism their performance can approach that of two separate meters.

Thus, a preferred embodiment of the invention provides two separate axially spaced apart pairs of electrodes 20, 50 associated with respective quasi-annular sensing regions having common mechanical components, including a common axial flow obstructing body, and either a common electromagnet or separate identical electromagnets sharing a common core. This provides a significant advantage over prior art magnetic flow other meters, which inherently have only one sensing region, and which need additional space to locate a second electromagnet so that it does not substantially interfere with the first. Moreover, in these prior art structures additional sensing and housing mechanical components are needed to make up the second independently sensed sensing region and the space required for these elements may not be available. In a conventionally configured magnetic flow meter having closely located redundant sensing regions the second pair of electrodes and the associated electromagnet would be near the first, would not have the precision advantage of sensing at two locations to thereby providing a better average of the flow rate, which is of particular concern if the flow profile varies. In the present invention, however, the only additional space required is for the second electromagnet winding.

Figure 3:
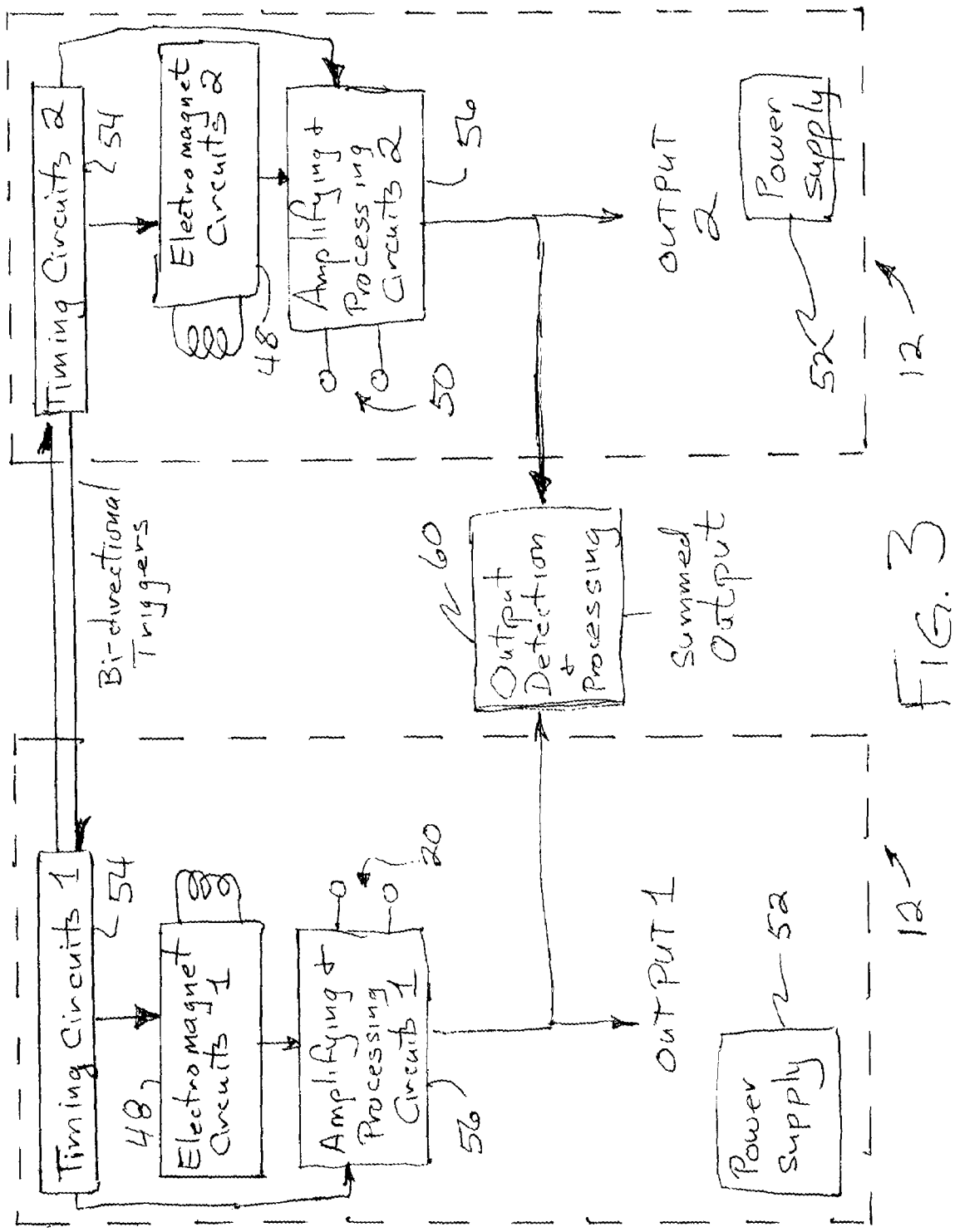
FIG. 3 is a schematic block diagram of a circuit portion of an embodiment of the flow meter of the invention.

Turning now to FIG. 3, one finds an overall electronic block diagram of a preferred embodiment of a magnetic flow meter of the present invention which is essentially the combination of two complete identical magnetic flow meters 12 with means for providing both individual and combined outputs, while preventing a malfunction of one from affecting the output of the other. Each of the meters has its own power supply 52, timing 54, electromagnet 48, and electrode signal amplifying and processing circuits 56. Although each can operate independently to provide an output signal, they are normally operated together by having their operational cycle pulse generators synchronized so that their magnetic fields and electrode signal amplification and processing occur at the same time. Each meter enjoys the benefit of having the additional flux from the other meter to double the voltage sensed at its electrodes.

The summed output from the common circuit block 60 for detecting and combining the two meter output signals typically has a gain of one half so that all three output signals would be approximately equal and would be available to the user for monitoring and control purposes. Should that circuit 60 detect a significant difference between the two output signals, indicative of a meter failure (for example one output is within the normal range and steady while the other is significantly lower or at zero, or is wildly fluctuating) that meter may be powered down. Then the summed output signal would be multiplied by a factor of two because one half of the normal summed signal has been lost and the remaining meter has lost one half of the electromagnetic flux. If a detectable malfunction, such as an abnormal electromagnetic excitation current is detected, and that current supply is thereby cut off, one can change the summed output gain factor to unity because half of the electromagnetic flux still remains and electrode signal detection circuits are still functional, available and contributing to the summed output signal. In most failure situations it is desirable to select the gain factor which will yield a combined output signal approximately equal to that of normal operation so that operations depending upon its output are not seriously inhibited until the failed meter can be restored. This summed output signal is normally the preferred one to use because it averages the flow sensing signals from two spaced apart locations to produce the provide the highest precision of measurement.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A magnetic flow meter for measuring the flow rate of a fluid through a tubular meter body having an axis, the apparatus comprising:
   at least one electromagnet operable to provide a magnetic field extending along a selected field direction perpendicular to the axis;
   at least one support member extending from an inner surface of the tubular meter body to an inner tube disposed coaxial with the meter body so as to define an inner flow path within the inner tube and a quasi-annular outer flow path disposed between the inner tube and the tubular meter body;
   at least one pair of electrodes, the two electrodes of each at least one pair disposed on opposite sides of the at least one supporting member so as to be spaced apart from each other along a line perpendicular to both the axis and to the selected field direction, each at least one pair of electrodes defining a respective voltage generating path extending circumferentially through the quasi-annular region from one electrode in the at least one pair thereof to the other; and
   measurement circuitry operable to measure a respective voltage generated along a respective at least one voltage generating path and to generate therefrom an output representative of the flow rate of the fluid through the tubular meter body.

2. The magnetic flow meter of claim 1 wherein the inner tube comprises an electrically conducting internal surface.

3. The magnetic flow meter of claim 1 wherein the inner tube comprises an upstream end shaped to control a ratio of fluid flowing through the inner tube to fluid flowing through the quasi-annular outer flow path.

4. The magnetic flow meter of claim 1 further comprising an obstruction within the inner tube, the obstruction acting to reduce an effective internal diameter of the inner tube.

5. The magnetic flow meter of claim 1 comprising a plurality of support members arranged so that the only entirely electrically insulating support member intersecting one of the at least one voltage generating paths is the support vane on which the pair of electrodes associated with that path are mounted.

6. A magnetic flow meter for measuring the flow rate of a fluid through a tubular meter body having an axis, the apparatus comprising:
   two electromagnets having substantially identical coils sharing a single core, each of the electromagnets independently operable to provide a respective magnetic field extending along a selected field direction perpendicular to the axis;
   at least one support member extending from an inner surface of the tubular meter body to a flow obstructing body disposed coaxial with the meter body to define a quasi-annular outer flow path disposed between the flow obstructing body and the tubular meter body;

at least two pairs of electrodes, the two electrodes of each pair disposed on opposite sides of the at least one supporting member so as to be spaced apart from each other along a line perpendicular to both the axis and to the selected field direction, each pair of electrodes defining a respective voltage generating path extending circumferentially through the quasi-annular region from one electrode in each one pair to the other; and measurement circuitry operable to measure at least one voltage generated along a respective at least one voltage generating path to generate therefrom an output representative of the flow rate of the fluid through the tubular meter body.

7. The magnetic flow meter of claim 6, further comprising synchronization circuitry for operating the two substantially identical coils in unison so as to produce substantially twice the magnetic flux produced by either one of them operated alone.

8. The magnetic flow meter of claim 6 wherein the flow obstructing body comprises an axially disposed tube.

9. The magnetic flow meter of claim 6 wherein the flow obstructing body comprises an axially disposed tube having an electrically conductive internal surface.

10. The magnetic flow meter of claim 6 wherein the flow obstructing body comprises an axially disposed tube and an obstructing member attached to the axially disposed tube and acting to reduce an effective internal diameter thereof.

11. The magnetic flow meter of claim 6 wherein the flow obstructing body comprises a streamlined body configured so as to prohibit axial flow of the fluid therethrough.

12. The magnetic flow meter of claim 6 wherein the single core is disposed external to the meter body.

13. The magnetic flow meter of claim 6 wherein the single core is disposed within the flow obstructing body.

14. A magnetic flow meter for measuring the flow rate of a fluid through a tubular meter body having an axis, the apparatus comprising:

two electromagnets comprising substantially identical coils wound on a common core, the two electromagnets operable to provide respective magnetic fields extending along a selected field direction perpendicular to the axis;

at least one support member extending from an inner surface of the tubular meter body to an inner tube disposed coaxial with the meter body so as to define an inner flow path within the inner tube and a quasi-annular outer flow path disposed between the inner tube and the tubular meter body;

two pairs of electrodes, the two electrodes of each pair spaced apart from each other along a line perpendicular to both the axis and to the selected field direction, each pair of electrodes defining a respective voltage generating path extending circumferentially through the quasi-annular region from one electrode in each pair thereof to the other; and measurement circuitry operable to measure respective voltages generated along the two voltage generating paths and to generate therefrom an output representative of the flow rate of the fluid through the tubular meter body.

* * * * *